(12) United States Patent
Malin

(10) Patent No.: US 8,517,317 B2
(45) Date of Patent: Aug. 27, 2013

(54) SHIM FOR A CLAMP SYSTEM

(75) Inventor: Glen K. Malin, Garden City, NY (US)

(73) Assignee: Allied Bolt, Inc., Garden City, NY (US)

( * ) Notice: Subject to any disclaimer, the term of this patent is extended or adjusted under 35 U.S.C. 154(b) by 0 days.

(21) Appl. No.: 13/093,993

(22) Filed: Apr. 26, 2011

(65) Prior Publication Data

US 2012/0273628 A1 Nov. 1, 2012

(51) Int. Cl.
*F16L 3/08* (2006.01)

(52) U.S. Cl.
USPC .............. 248/74.1; 248/63; 248/58; 403/213; 24/136 R; 174/40 CC

(58) Field of Classification Search
USPC ................. 248/63, 74.1, 74.2, 74.4, 68.1, 58, 248/62; 24/136 L, 136 R, 115 M, 130, 129 B, 24/129 R; 403/371, 112, 109, 16, 213, 212, 403/314; 174/41, 40 CC
See application file for complete search history.

(56) References Cited

U.S. PATENT DOCUMENTS

| | | | | |
|---|---|---|---|---|
| 482,975 | A * | 9/1892 | Cope ............................ | 24/136 R |
| 1,365,411 | A * | 1/1921 | Kearney ....................... | 24/136 R |
| 2,068,368 | A * | 1/1937 | Bouvier et al. ............... | 403/314 |
| 2,131,171 | A * | 9/1938 | Fotsch ......................... | 24/136 R |
| 2,472,527 | A * | 6/1949 | Gordon et al. ................ | 403/212 |
| 3,325,128 | A | 6/1967 | Elleboudt | |
| 3,349,167 | A * | 10/1967 | Mixon, Jr. et al. .......... | 174/94 R |
| 4,045,612 | A | 8/1977 | Troy | |
| 4,592,117 | A * | 6/1986 | Ruehl et al. ................. | 24/136 R |
| 4,939,821 | A | 7/1990 | Frank, Jr. | |
| 5,050,273 | A * | 9/1991 | Okura .......................... | 24/136 R |
| 5,121,525 | A | 6/1992 | Okura .......................... | 24/136 R |
| 5,142,745 | A * | 9/1992 | Setty et al. ................... | 24/136 R |
| 6,581,251 | B2 | 6/2003 | Malin | |
| 6,732,981 | B2 * | 5/2004 | Franks et al. ................ | 248/74.1 |
| 7,097,153 | B2 * | 8/2006 | Rivers et al. ......... | 254/134.3 FT |
| 7,234,669 | B2 * | 6/2007 | Franks, Jr. ..................... | 248/63 |
| 7,367,534 | B2 * | 5/2008 | Franks, Jr. ................... | 248/74.1 |

OTHER PUBLICATIONS

International Search Report and Written Opinion of PCT/US2011/033893, dated Oct. 28, 2011 (corresponding to U.S. Appl. No. 13/093,993).

* cited by examiner

*Primary Examiner* — Terrell McKinnon
*Assistant Examiner* — Monica Millner
(74) *Attorney, Agent, or Firm* — Baker Botts LLP

(57) ABSTRACT

A shim to secure a cable against a shell of a clamp using a wedge to bias the shim against the cable onto the shell. The shim includes an elongate shim base with longitudinal sides, a first end, a second end, and a center longitudinal axis. The shim also includes a first and second raised sidewall having a height and respectively coupled to the longitudinal sides of the base and extending away from the base. Additionally, the shim can include a stabilizing structure coupled to the first and second raise sidewalls to secure the shim laterally in the shell.

25 Claims, 6 Drawing Sheets

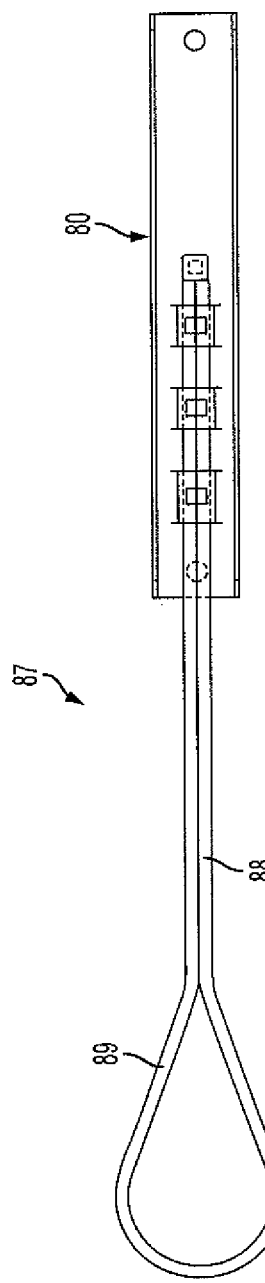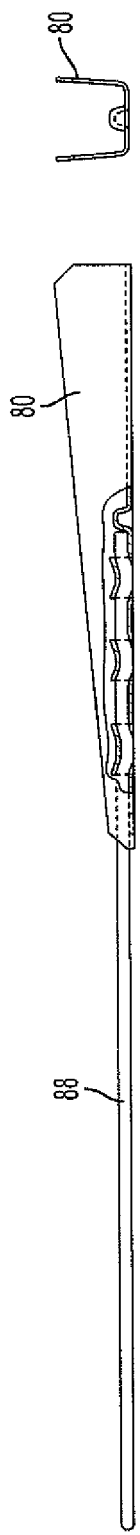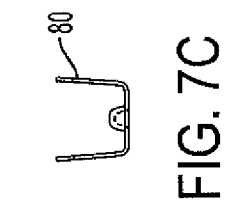

SHIM FOR A CLAMP SYSTEM

FIELD

The disclosed subject matter relates to clamping systems and in particular drop wire clamps. Drop wire clamps are commonly used to secure telephone cables and the like. Such clamps can be used to secure a cable, intermediate at its ends, to a span clamp or house attachment in which a portion of the cable extends beyond the drop wire clamp. These clamps are commonly used to secure a variety of telephone lines on the outside of buildings, at a point just short of the position in which these cables enter the building.

Various drop wire clamps have been developed which commonly provide clamping intended to secure a cable. An example of a known clamp is provided in U.S. Pat. No. 6,581,251, the disclosure of which is herein incorporated by reference.

Some known drop wire clamps, however, have deficiencies. For example, many clamps damage the cable itself or the insulation of the structure. Larger clamps are often used to accommodate smaller cables, such as fiber optic cables, and are difficult to secure the smaller cables within the clamp. Often times the small cables move laterally in the clamp and pull through the clamp with little force. Due to the shifting of the cable in the clamp, the cable is often easily cut by the housing of the clamp. Additionally, many clamping systems loosen over a time period. There exists a need for an improved clamp that overcomes at least the above-identified issues.

SUMMARY

The disclosed subject matter herein provides a shim to secure a cable against a shell of a clamp using a wedge to bias the shim against the cable onto the shell, comprising an elongate shim base with longitudinal sides, a first end, a second end, and a center longitudinal axis, and a first and second raised sidewall having a height and respectively coupled to the longitudinal sides of the base and extending away from the shim base.

According to a further aspect of the invention, there is provided a clamp system to secure a cable, comprising a shell having a shell base and a longitudinal length; a shim adapted to sandwich a cable between the shell and the shim, the shim including an elongate shim base with longitudinal sides, a first end, a second end, and a center longitudinal axis, a first and second raised sidewall having a height and respectively coupled to the longitudinal sides of the base and extending away from the base, and a stabilizing structure coupled to the first and second raise sidewalls to secure the shim laterally in the shell; and a wedge longitudinally insertable in the shell and above the shim, wherein the wedge biases the shim against the cable towards the base of the shell.

BRIEF DESCRIPTION OF THE DRAWINGS

The subject matter of the application will be more readily understood from the following detailed description when read in conjunction with the accompanying drawings, in which:

FIG. 7A is a top view of the device and wedge according to the disclosed subject matter;

FIG. 7B is a side view of FIG. 7A according to the disclosed subject matter; and FIG. 7C is a cross-sectional view of the wedge of FIG. 7B according to the disclosed subject matter.

DETAILED DESCRIPTION

Figure 1:
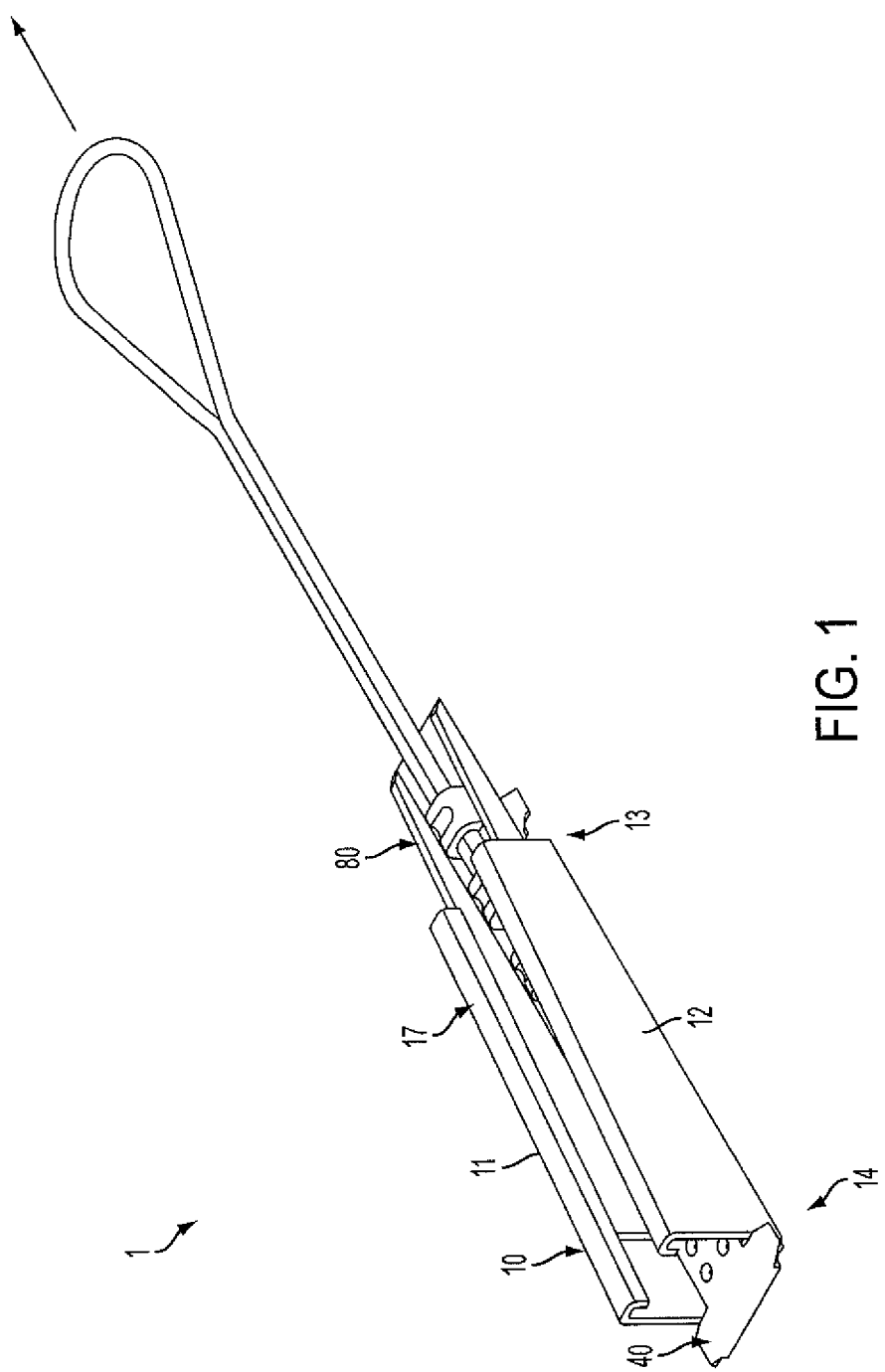
FIG. 1 is an overall perspective view of the clamp according to the disclosed subject matter.
Figure 2A:
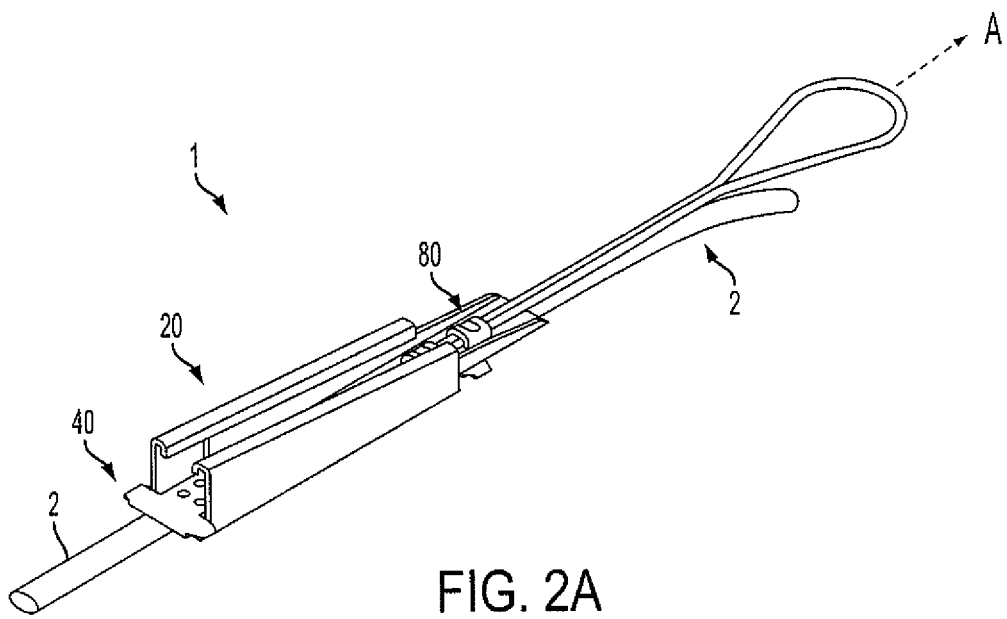
FIG. 2A is an overall perspective view of the clamp securing a cable according to the disclosed subject matter.
Figure 2B:
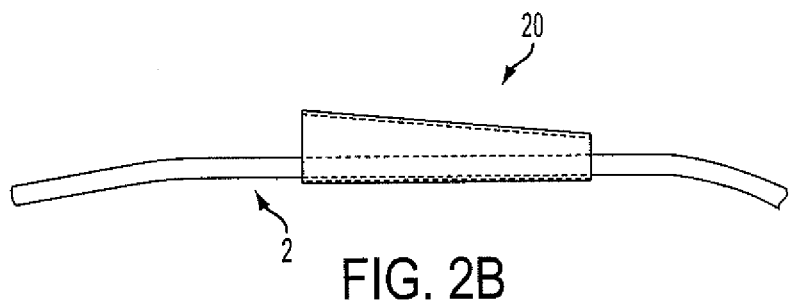
FIG. 2B is a side view of the shell with a cable according to the disclosed subject matter.
Figure 2C:
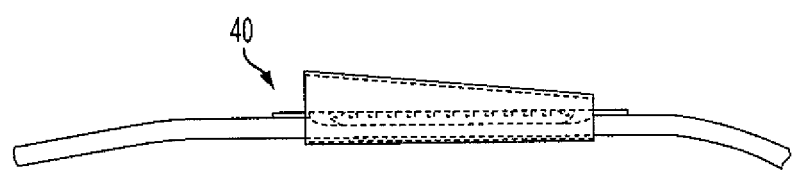
FIG. 2C is a side view of the shell, cable, and shim according to the disclosed subject matter.

FIG. 1 provides an overall perspective view of an embodiment of the subject matter. A clamp 1 is provided having a shell 10, a shim 40, and a wedge 80. The shell 10, shim 40, and wedge 80 cooperate together to secure a cable between the shell 10 and the shim 40, as provided in FIG. 2D. The shim 40 is adapted to sandwich the cable between the shell 10 and the shim 40, as depicted in FIG. 2C. The wedge 80 is longitudinally insertable into the shell 10 and above the shim 40. As provided in FIG. 2D, the wedge 80 can bias the shim 40 against the cable towards the shell 10 to keep the cable in a desired position. FIG. 2A provides an overall perspective view of an embodiment of the subject matter with the clamp 1 securing a fiber optical cable 2.

The shell 10 includes a first shell sidewall 11, a second shell sidewall 12, a first end 13, and a second end 14, as provided in FIG. 1. The sidewalls 11, 12 increase in height along the longitudinal length of the shell from the first end 13 to the second end 14. The first shell side wall 11 and the second shell sidewall 12 are substantially the same and mirror images of each other. Thus, at the first end 13, the first shell sidewall 11 and the second shell sidewall 12 have the same height H1, as provided in FIG. 3A. At the second end 14, the sidewalls 11, 12 have the same height 112, as provided in FIG. 3B. In one embodiment, H1 is approximately 0.5 inches and H2 is approximately 0.36 inches. Other heights are contemplated herein and the preceding dimensions are provided merely as an example.

The shell 10 has a shell base 15 positioned between the shell sidewalls 11, 12. The shell base 15 and the shell sidewalls 11, 12 make an approximate U-shaped configuration, as provided in FIGS. 3A and 3B. The shell base 15 includes an inside surface and an outside surface. The inside surface can include an inner friction engaging surface 16 to engage the cable 2 with shell 10, as provided in FIG. 3C. In one embodiment, the inner friction engaging surface 16 includes flat ridges or teeth 16a, as provided in FIG. 3D. The ridges 16a can be affixed to the shell subsequent to the formation of the shell 10. Alternatively, the shell 10 with the ridges 16a can be a monolithic structure. The ridges can be stepwise linear along the inside base, as provided in FIGS. 3C and 3D.

Figure 3A:
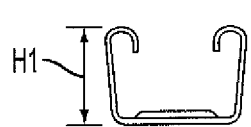
FIG. 3A is a cross-sectional view of the shell at a first end according to the disclosed subject matter.
Figure 3B:
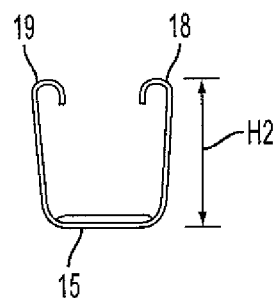
FIG. 3B is a cross-sectional view of the shell at a second end according to the disclosed subject matter.
Figure 3C:
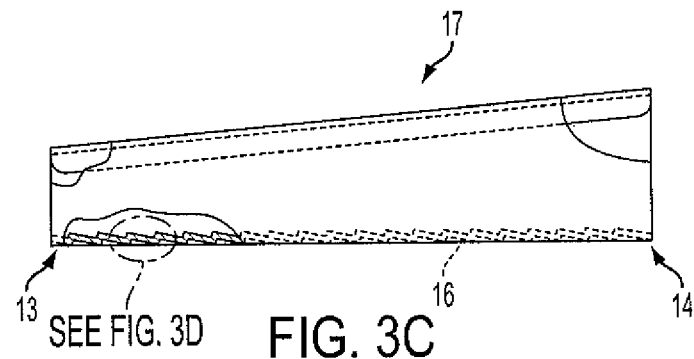
FIG. 3C is a side view of the shell according to the disclosed subject matter.
Figure 3D:
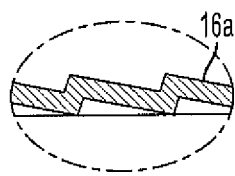
FIG. 3D is detailed view of the friction engaging member of FIG. 3C according to the disclosed subject matter.
Figure 3E:
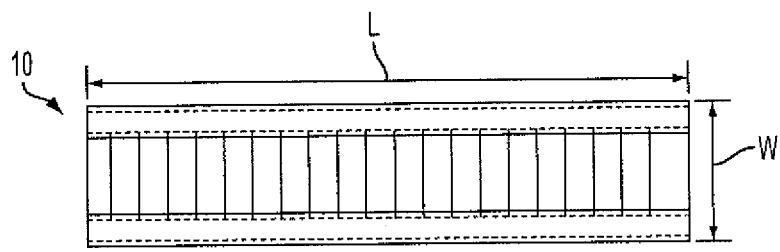
FIG. 3E is a top view of the shell according to the disclosed subject matter.

FIG. 3E provides a top view of the shell 10. The dimensions of the shell 10 can vary. For example, but not limited to, the length L of the shell 10 can be approximately 2.75 inches and the width of the shell W can be approximately 0.65 inches.

The first and second shell sidewalls 11, 12 each have a top longitudinal ridge 17. The ridge 17 includes inwardly bent ends of the sidewalls 11, 12 which form respective channels 18, 19, as depicted in FIGS. 1, 3A and 3B. The channels have an approximately U-shaped cross-section. The width of the channel base can be, for example, but not limited to, approximately 0.095 inches with the inner flange being approximately 0.12 inches in length.

The thickness of the shell 10 can vary. For example, but not limited to, the shell 10 can have a uniform thickness of approximately 0.030 inches. The shell 10 receives one or a plurality of cables between the first shell sidewall 11 and the second shell sidewall 12, as provided in FIG. 2B.

The shim 40 is adapted to sandwich the cable between the shim 40 and the inner surface of the shell base, as depicted in FIG. 2C. The shim 40 has an inside surface that engages with the cable 2 and an outside surfaces that engages with the wedge 80.

Figure 4A:
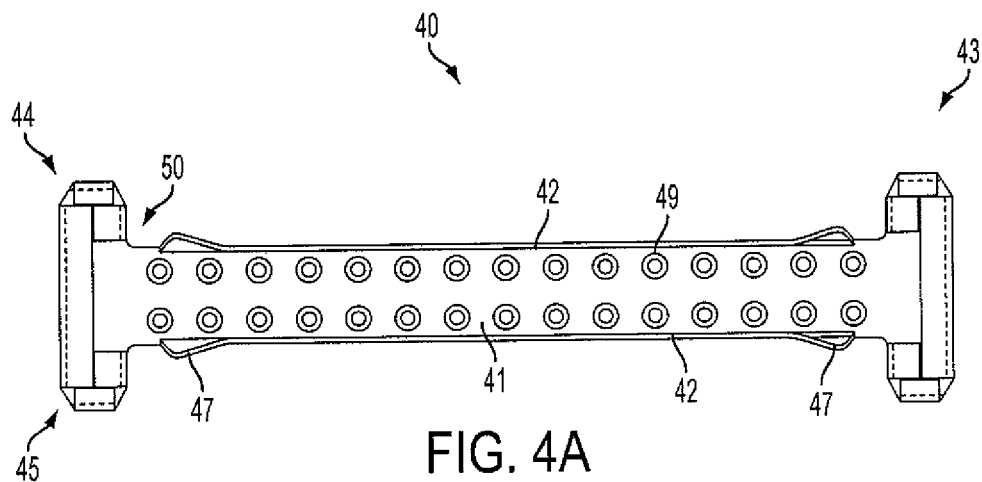
FIG. 4A is bottom view of the shim according to the disclosed subject matter.

FIG. 4A provides a shim 40 which includes an elongate shim base 41 having a center longitudinal axis. The shim base 41 is substantially rectangular. In one embodiment, the width of the elongate shim base 41 is greater than the distance between the inner flanges of the channel 19 to prevent the shim 40 from dislodging from the clamp. The shim 40 has longitudinal sides 42, a first end 43, and a second end 44, as shown in FIG. 4A. End sections 45 are coupled to the first end 43 and the second end 44 of the shim. The end sections 45 have substantially smooth inner surfaces to prevent damage to the cable.

The shim 40 makes substantially an "I" formation with the positioning of the shim base 41 with the end sections 45. For example, but not limited to, the length of the shim 40 can be approximately 3.375 inches and the width 0.85 inches. The dimensions of the shim 40 however must complement the dimensions of the shell 10 so that the shim fits within the shell sidewalls 11, 12. The end sections 45 create the inner corners 50 of the "I" formation. The end sections fit outside the dimensions of the shell 10 so that the corners 50 create a stop abutment. The corners 50 prevents the shim from shifting past the shell 10 longitudinally.

Figure 4B:
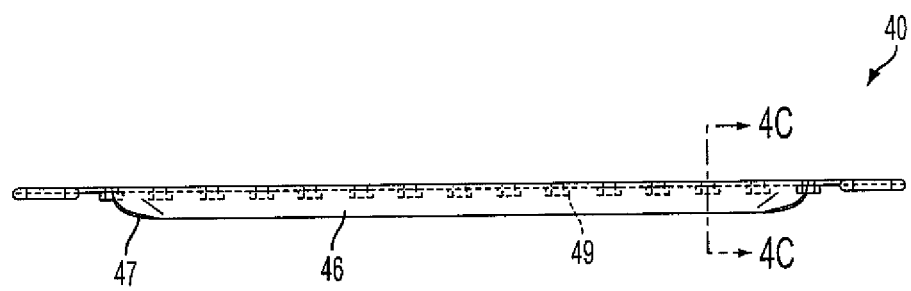
FIG. 4B is side view of the shim of FIG. 4A according to the disclosed subject matter.

As depicted in FIG. 4B, first and second raised sidewalls 46 are coupled to the longitudinal sides of the base. The raised sidewalls are substantially the same and can be mirror images of each other, as depicted in FIG. 4B. Each raised sidewall 46 has a height and extends away from the shim base 41. The raised sidewalls 46 extend substantially perpendicular to the shim base. In another embodiment, the raised sidewalls 46 extend at an angle from the elongate shim base and increases a width of the shim along the shim base to reduce a lateral distance between the shim and the shell. For example, but not limited to, the raised sidewalls 46 can have a height of approximately 0.125 inches.

The raised sidewalls 46 can include a stabilizing structure to secure the shim laterally in the shell. The stabilizing structure protrudes away from the longitudinal axis and increases a width of the shim along the shim base. Further, the stabilizing structure reduces a lateral distance between the shim and the shell.

In one embodiment, each raised sidewall 46 includes a plurality of stabilizing structures along a longitudinal length of the raised sidewalls. The stabilizing structure can include a curved bowed out device bent away from the longitudinal axis to form an ear 47.

Each raised sidewall 46 includes two end sections. The two end sections can include ears 47 at each respective end section, as depicted in FIGS. 4A and 4B. The four ears 47 cradle the cable within the shim to prevent lateral movement of the cables. The ears 47 further prevent damage to the cable.

Figure 4C:
FIG. 4C is a cross-sectional view of the shim of FIG. 4A along the dotted lines according to the disclosed subject matter.

The shim base 41 can also include a friction engaging surface 48 to engage the cable with the shim base. The friction engaging surface 48 is located on the inside surface of the shim base 41. In one embodiment, the shim base 41 is serrated as provided in FIG. 4A. The friction engaging surface can include a plurality of holes with raised edges 49 surrounding the holes, as provided in FIGS. 4B and 4C. The raised edges 49 extend in the same direction as the first and second sidewalls 46.

Figure 2D:
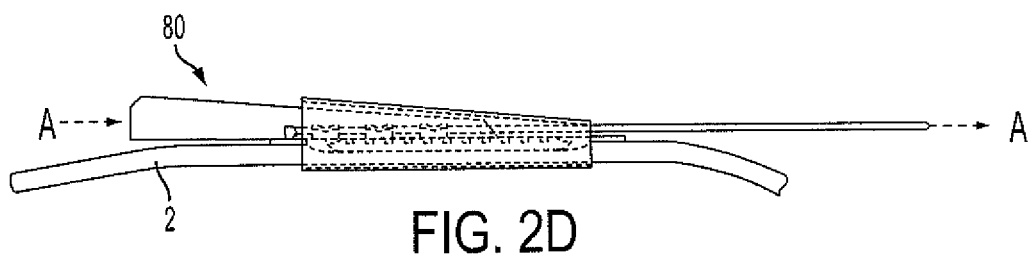
FIG. 2D is a side view of the shell, cable, shim, and wedge according to the disclosed subject matter.

The wedge 80 is longitudinally insertable in the shell in the direction of A, as provided in FIG. 2D. The wedge 80 is positioned above the shim 40 to bias the shim against the cable towards the base of the shell. As provided in FIG. 5A, the wedge 80 includes a wedge base 81, a first wedge sidewall 82, and a second wedge sidewall 83. The wedge base 81 is positioned between the first and second wedge sidewalls 82, 83. The wedge base 81 and the wedge sidewalls 82, 83 make an approximate U-shaped configuration, as provided in FIG. 5A.

Figure 5A:
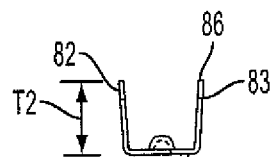
FIG. 5A is a cross-sectional view of a wedge at a second end according to the disclosed subject matter.
Figure 5B:
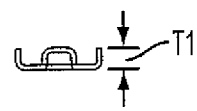
FIG. 5B is a cross-sectional view of the wedge of FIG. 5A at a first end according to the disclosed subject matter.
Figure 5C:
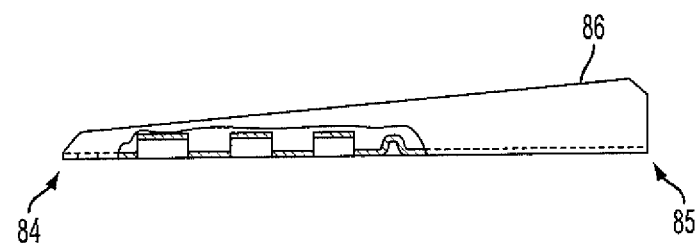
FIG. 5C is a side view of the wedge of FIG. 5A according to the disclosed subject matter.

The first and second wedge sidewalls 82, 83 increase in height along the length from a first end 84 to a second end 85 of the wedge, as disclosed in FIGS. 5A and 5C. The first and second wedge sidewalls 82, 83 are substantially the same and mirror images of each other. Thus, at the first end 84, the first wedge sidewall 82 and the second wedge sidewall 83 have the same height T1, as provided in FIG. 5B. At the second end 85 of the wedge, the sidewalls 82, 83 have the same height T2, as provided in FIG. 5A. In one embodiment, T1 is approximately 0.136 inches and T2 is approximately 0.437 inches. Other heights are contemplated herein and the preceding dimensions are provided merely as an example.

The first and second wedge sidewalls 82, 83 each include a top 86 slidably insertable in the channels 18, 19 of each shell sidewall 11, 12. The inner flanges of the shell 10 keeps the top 86 of the wedge sidewalls secure within the channels 18, 19.

The first end 84 of the wedge is insertable into the second end 14 of the shell, so that the smaller height T1 of the wedge 80 fits into the larger height H2 of the shell 10. The outside surface of the wedge base 81 slides along the outside surface of the shim 40.

The wedge 80 can be inserted into the shell by a force exerted upon the second end of the wedge. For example, a hammer can tap the wedge into the shell 10 above the shim 40 to secure the cable 1 in the clamp 1. Alternatively, the wedge 80 can be pulled into the shell with a device 87. The device 87 can also be used to unlock the clamp 1 to allow the cable 2 to be free of the clamp 1. To unlock the clamp 1, the device 87 should be pushed in the direction opposite that of direction A, as provided in FIG. 2A.

The device 87 can be a tail wire 88 with a loop 89, as provided in FIGS. 7A, 7B, and 7C. The tail wire 88 can be secured to the wedge base 81. In one embodiment, the tail wire 88 is insertable into a housing on the wedge base 81 and subsequently secured. The cross-section of FIG. 7C provides an example of a housing to receive the tail wire 88. The length of the tail wire 88 can vary.

Figure 5D:
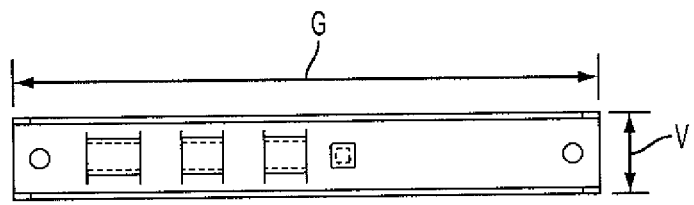
FIG. 5D is a top view of the wedge of FIG. 5A according to the disclosed subject matter.
Figure 6:
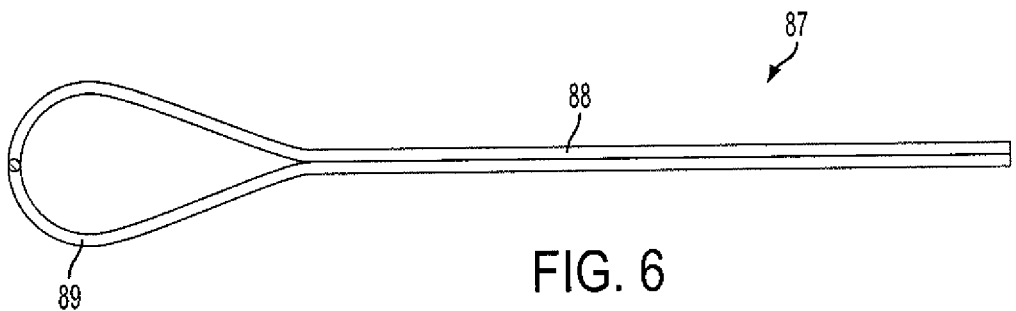
FIG. 6 is device coupled to the wedge of FIG. 5C according to the disclosed subject matter.

The dimensions of the wedge 80 can vary. For example, but not limited to, a length G of the wedge 80 can be approximately 3.5 inches and a width V of the wedge can be approximately 0.51 inches, as provided in FIG. 5D. The dimensions of the wedge 80, however, should be smaller than the dimensions of the shell 10 so that the wedge 80 is insertable into the shell 10. The thickness of the wedge 80 can vary. For example, but not limited to, the wedge 80 can have a uniform thickness of approximately 0.03 inches.

The clamp 1 can be manufactured from a plurality of materials. In one embodiment, the clamp 1 is manufactured from a metal, for example, but not limited to stainless steel, aluminum, plastic, or the like.

It will be understood that the above description of the present invention is susceptible to various modifications, changes and adaptations, and the same are intended to be comprehended within the meaning and range of equivalents of the appended claims.

What is claimed is:

1. A shim to secure a cable against a shell of a clamp using a wedge to bias the shim against the cable onto the shell, comprising:
   an elongate shim base with first and second longitudinal sides, an outside surface to engage the wedge, an inside surface to engage the cable, a first end, a second end, and a center longitudinal axis, and
   a first and second raised sidewall each having a height, the first raised sidewall coupled to the first longitudinal side at an angle with respect to the elongate shim base and the second raised sidewall coupled to the second longitudinal side at an angle with respect to the elongate shim base, wherein the cable is disposed between and engages the first and second raised sidewalls of the shim, the inside surface of the shim base, and the shell, wherein the first and second raised sidewalls extend away from the elongate shim base and secure the cable within the shell.

2. The shim according to claim 1, wherein at least one of the raised sidewalls includes a stabilizing structure to secure the shim laterally in the shell.

3. The shim according to claim 2, wherein the stabilizing structure protrudes away from the longitudinal axis and increases a lateral width of the shim along the shim base.

4. The shim according to claim 2, wherein the stabilizing structure comprises a curved bowed out device bent away from the longitudinal axis to form an ear.

5. The shim according to claim 4, wherein the ear is positioned at an end section of at least one of the raised sidewalls.

6. The shim according to claim 1, wherein each raised sidewall includes two end sections, wherein each end section includes a curved bowed out device bent away from the longitudinal axis to form an ear.

7. The shim according to claim 1, wherein each angle of each raised sidewall is substantially perpendicular from the elongate shim base.

8. The shim according to claim 3, wherein the stabilizing structure reduces a lateral distance between the shim and the shell.

9. The shim according to claim 1, wherein a longitudinal section of the shim base is substantially rectangular.

10. The shim according to claim 1, wherein the inside surface of the shim base includes a friction engaging surface for engaging the cable with the shim base.

11. The shim according to claim 10, wherein the friction engaging surface includes a plurality of holes with raised edges surrounding the holes.

12. The shim according to claim 11, wherein the raised edges are on the inside surface of the shim base and the raised sidewalls extend in a direction of the inside surface of the shim base toward the shell.

13. The shim according to claim 1, wherein the shim includes end sections having smooth surfaces to prevent damage to the cable.

14. The shim according to claim 13, wherein the elongate shim base and the end sections form an "I" structure.

15. The shim according to claim 1, wherein the shim comprises stainless steel, aluminum, or plastic.

16. The shim according to claim 1, wherein the raised side walls are mirror images of each other with respect to the center longitudinal center axis.

17. The shim according to claim 1, wherein each raised sidewall increases a width of the shim along the shim base to reduce a lateral distance between the shim and the shell.

18. The shim according to claim 1, wherein each raised sidewall includes a plurality of stabilizing structures along a longitudinal length of the raised sidewalls.

19. The shim according to claim 1, wherein the first longitudinal side has a length and the first raised sidewall is coupled to the first longitudinal side along the length of the first longitudinal side and wherein the second longitudinal side has a length and the second raised sidewall is coupled to the second longitudinal side along the length of the second longitudinal side.

20. The shim according to claim 1, wherein the first raised sidewall and the second raised sidewall extend away from the elongate shim base in a direction from the outside surface toward the inside surface and distal to the inside surface.

21. The shim according to claim 1, wherein the first longitudinal side and the second longitudinal side are evenly spaced apart from each other with respect to the center longitudinal axis and the first longitudinal side and the second longitudinal side are substantially parallel with one another.

22. The shim according to claim 1, wherein each height of the first and second raised sidewall is substantially the same.

23. The shim according to claim 1, wherein the shim sandwiches the cable between an inner surface of the shell and respective inner surfaces of the first and second raised sidewalls.

24. The shim according to claim 1, wherein the first and second raised sidewalls extend away from the elongate shim base toward the shell.

25. The shim according to claim 1, wherein the shim sandwiches the cable between the inside surface of the shim base, an inner surface of a base of the shell, and respective inner surfaces of the first and second raised sidewalls.

* * * * *